United States Patent
Lee et al.

(10) Patent No.: US 7,257,761 B2
(45) Date of Patent: Aug. 14, 2007

(54) METHOD FOR PREVENTING READ ERRORS IN OPTICAL DISC DRIVE

(75) Inventors: Steve Lee, Taipei (TW); Donnie Wu, Taichung (TW)

(73) Assignee: ASUSTek Computer Inc., Taipei (TW)

( * ) Notice: Subject to any disclaimer, the term of this patent is extended or adjusted under 35 U.S.C. 154(b) by 733 days.

(21) Appl. No.: 10/668,220

(22) Filed: Sep. 24, 2003
(Under 37 CFR 1.47)

(65) Prior Publication Data
US 2004/0064766 A1  Apr. 1, 2004

(30) Foreign Application Priority Data
Sep. 24, 2002 (TW) ............................. 91121854 A

(51) Int. Cl.
*G11C 29/00* (2006.01)
(52) U.S. Cl. ...................................... 714/763
(58) Field of Classification Search ................ 714/763
See application file for complete search history.

(56) References Cited

U.S. PATENT DOCUMENTS 5,986,985 A * 11/1999 Kawamura et al. ...... 369/44.27
6,446,739 B1 * 9/2002 Richman et al. ............ 175/331
6,977,878 B2 * 12/2005 Lee et al. ................. 369/47.38

* cited by examiner

*Primary Examiner*—Shelly Chase
(74) *Attorney, Agent, or Firm*—Birch, Stewart, Kolasch & Birch, LLP

(57) ABSTRACT

A method for improving data accuracy and data flow of a disc servo system to read data on a disk. First of all, a read mode of the disc servo system is determined. If the read mode is an audio/video play mode, a first read procedure to read the data on the disk is executed. If the read mode is a document read mode, a second read procedure to read the data on the disk is executed. The second read procedure is different from the first read procedure. Finally, the data is output to further processes.

8 Claims, 4 Drawing Sheets

METHOD FOR PREVENTING READ ERRORS IN OPTICAL DISC DRIVE

This nonprovisional application claims priority under 35 U.S.C. § 119(a) on Patent Application No(s). 91121854 filed in TAIWAN, R.O.C. on Sep. 24, 2002, which is(are) herein incorporated by reference.

BACKGROUND OF THE INVENTION

1. Field of the Invention

The invention relates to a method for improving data accuracy in an optical disc drive, and particularly to a method having a plurality of read procedures to read data on an optical disk depending in what a read mode the optical disc drive is.

2. Description of the Related Art

Recently, optical storage media, such as compact disc (CD) and recordable compact disc (CD-R and CD-RW) has had significant advance in the evolution of data storage. With the development of optical storage media, data can be recorded and backed up into optical disks with high capacity and light weight. Furthermore, the optical storage media has superior and reliable quality for audio and video data. As an obvious result, the optical storage media has been replacing a lot of traditional data storage media, such as tapes and films.

FIG. 1 shows a block diagram of a disc servo system in an optical disc drive as an example. An optical head 11 reads reflected signals from an optical disc 10. Being amplified and processed by the RF (Radio Frequency) IC 12, the FE (Focus Error) signal, TE (Track Error) signal and relative data and signals as read are input to DSP (Digital Signal Processor) and microprocessor 13.

After analyzing the received signals, the microprocessor 13 accordingly generates and outputs signals to corresponding servos (Focusing Servo 14, Tracking Servo 15 and Spindle Motor Servo 16) to control the actuators (focusing actuator 17 and tracking actuator 18), sled motor 19 and spindle motor 20 and to ensure data accuracy during reading or writing.

Damaged tracks on the optical disc and defocus of the laser beam from the optical head 11 occur from time to time. These events cause readout data from the optical disk as inaccurate or unacceptable. Since these events is inevitable and readout data should be as accurate as possible, there is a need to improve data accuracy while read data on the optical disk.

Traditionally, the method for improving data accuracy is to reread the data while the data as read is unacceptable no matter what kind of a read mode the disk servo system is in. Details of the traditional method are shown in FIG. 2. First, the optical head of the optical disc drive reads data from an optical disc (step S1). When the data cannot be read (or is unacceptable as read) and a buffer for temporarily storing readout data stores an sufficient amount of data for output (step S2), the data is reread (step S1). The sufficient amount is in consideration of smoothness of data follow in view of the data receiver, receiving data from the buffer, to prevent from any discontinuity of the data follow. When the data is read correctly (in other words, acceptable) or the buffer has an insufficient amount of data for output, the data is compulsorily written into the buffer (step S3). Eventually, the data is output (step S4) form the buffer.

Generally, if the disc servo system is in a document read mode (reading documentary files from an optical disk), data accuracy is the most important consideration and rereading the disc may be executed as many times as wished. Nevertheless, when the disc servo system is in an audio/video play mode (playing an audio/video program from an optical disk), not only the data accuracy but also time constrain must be considered. Data accuracy provides high quality of sound or picture can be achieved or enhanced by rereading, as mentioned before. But, human being is also sensitive to any break or discontinuity while enjoying an audio/video program. When rereading is executed too many times, output of data from the buffer may be interrupted and break or discontinuity in data flow occurs because of running out of the data inside the buffer. In other words, compromise between data accuracy and time constrain is necessary and inevitable when the disc servo is in an audio/video mode.

Following the method in FIG. 2, the traditional disk servo system has only one criteria to decide whether rereading is executed. If this criteria is set for guaranteeing data accuracy, too many times of rereading may occur and an user will hear or see break/noise while the disk servo system is playing an audio/video program. If this criteria is set for guaranteeing smoothness of data flow, unacceptable or erroneous data may be output to cause a defective document while the disk servo system is reading a file for copy. One criteria beneficial to performance in one read mode will damage performance in the other read mode.

SUMMARY OF THE INVENTION

Accordingly, an object of the present invention is to benefit the performance of a disc servo system no matter it is in an audio/video play mode or in a document read mode.

To achieve the object of the present invention, the present invention provides a method for improving data accuracy for a disc servo system to read data on a disk. This method provides two different read procedures to read the data on the disk, the first read procedure and the second read procedure. The first read procedure is especially for being used when the disc servo system is in the audio/video play mode, while the second read procedure for being used when the disc servo system is in the document read mode.

When data read from the disc is unacceptable or can not be read, criteria for determining whether rereading the data on the disc in the first read procedure should be executed may differ from that in the second read procedure.

This criteria, for example, can be a predetermined requirement of stored data in the buffer, and when the stored data in the buffer is more than the predetermined requirement rereading will be performed. The predetermined requirement for the first read procedure is more than that for the second read procedure.

This criteria, for example, can be a count number, and when the count of rereading is less than the count number, rereading will be performed. The count number for the first read procedure is less than that for the second read procedure.

According to the present invention, compromise becomes unnecessary since the disc servo system has two different read procedures corresponding to an audio/video play mode and an document read mode. One read procedure aims at smoothness of data flow and the other aims at data accuracy. This invention improves the performance of the disc servo system in both read modes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
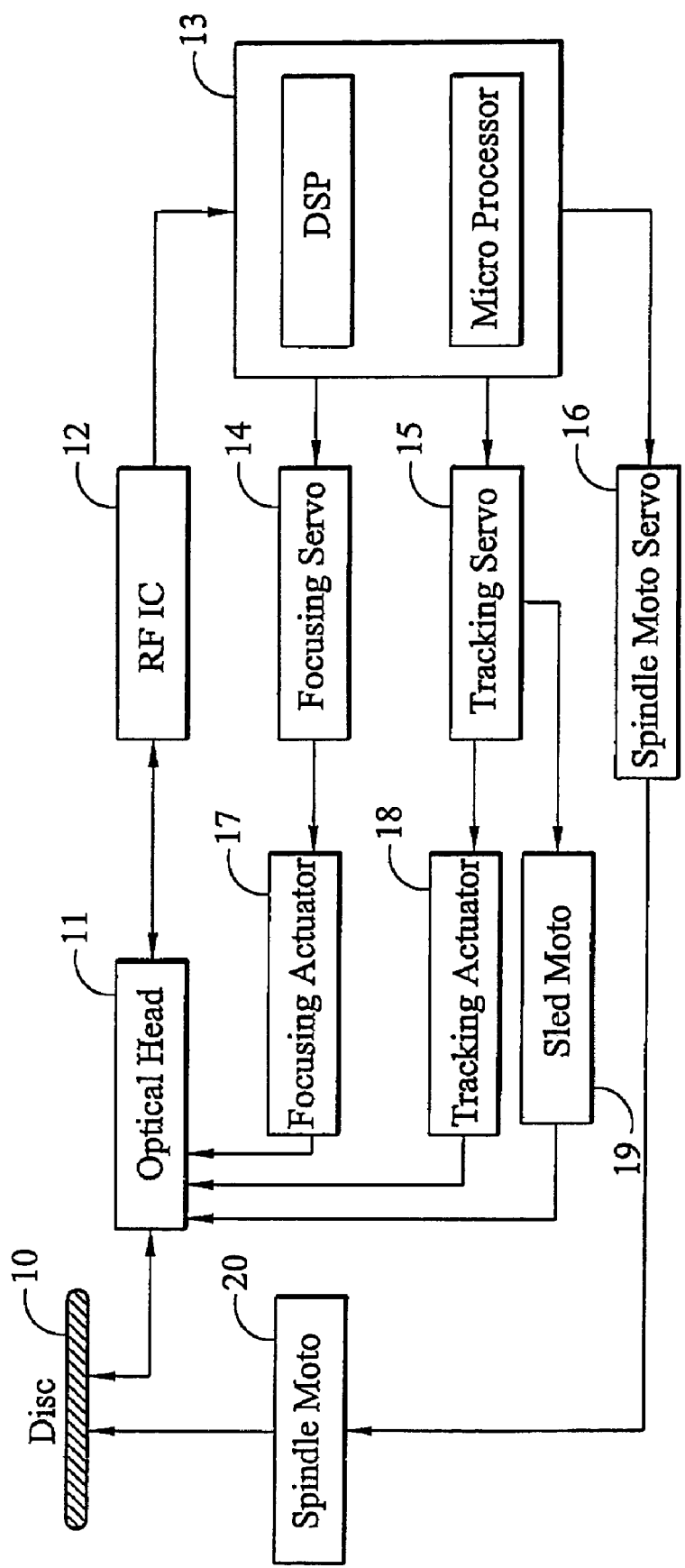
FIG. 1 is a block diagram of a disc servo system.
Figure 2:
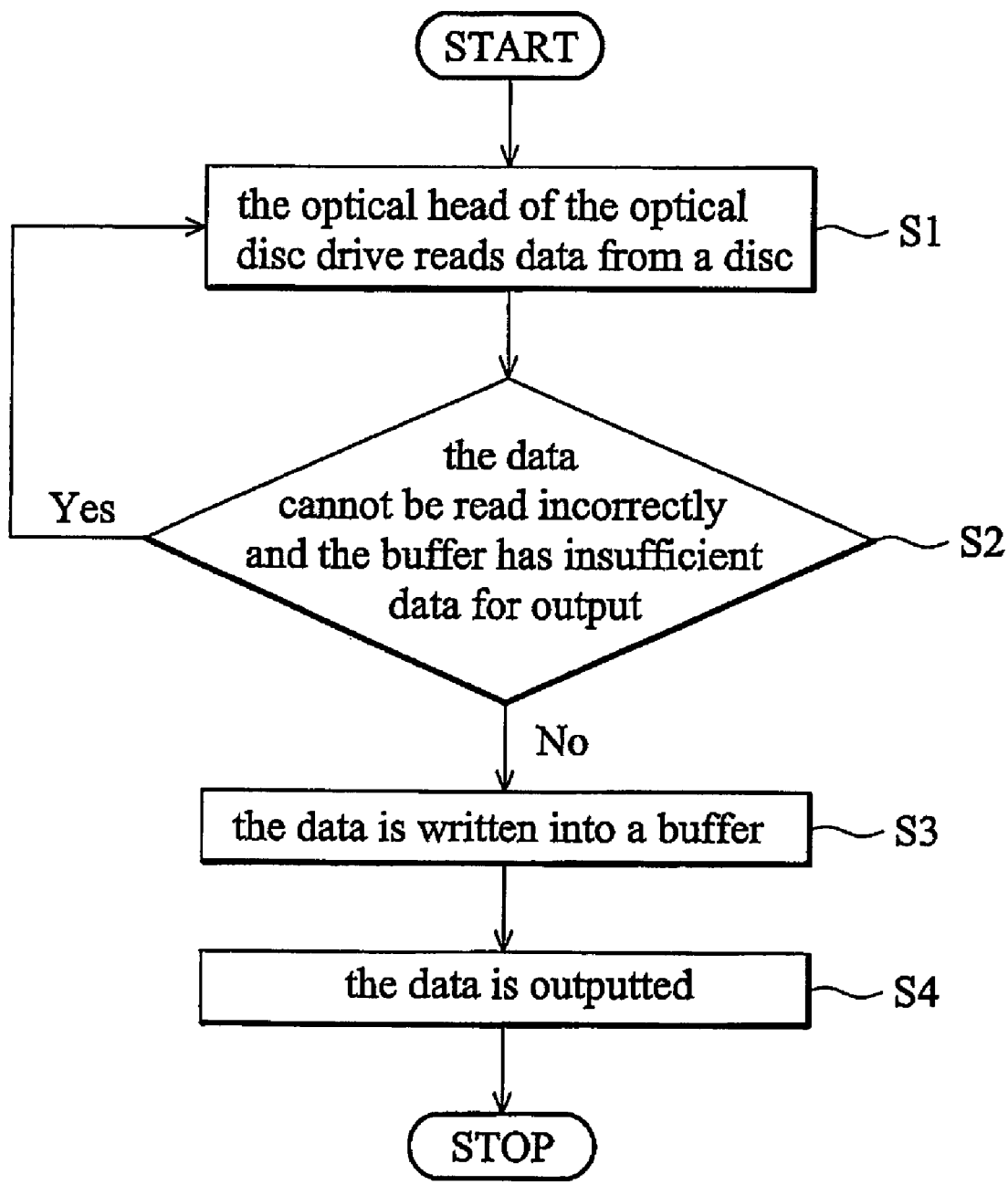
FIG. 2 is a flow diagram of a conventional read procedure of an optical disc drive.

The disc servo system may have the same machine combination as shown in FIG. 1 but differs in controlling. A disc in the embodiments of this invention is a music CD or a video CD as an example. The data in a music CD or a video CD lacks error correction to cause difficulty during data retrieving. Of course, no error in the data flow would be better. Somehow minor errors in the data flow always happen and are acceptable if the user of the music/video CD only senses tiny noisy or defective sound/picture during playing an audio/video program. Nevertheless, during copying files from the music/video CD for example, the disc servo system is allowed to have more time for reading correct data from the CD. This more time for reading can be achieved by rereading repeatedly or by reducing the rotation speed of the music/video CD.

Figure 3:
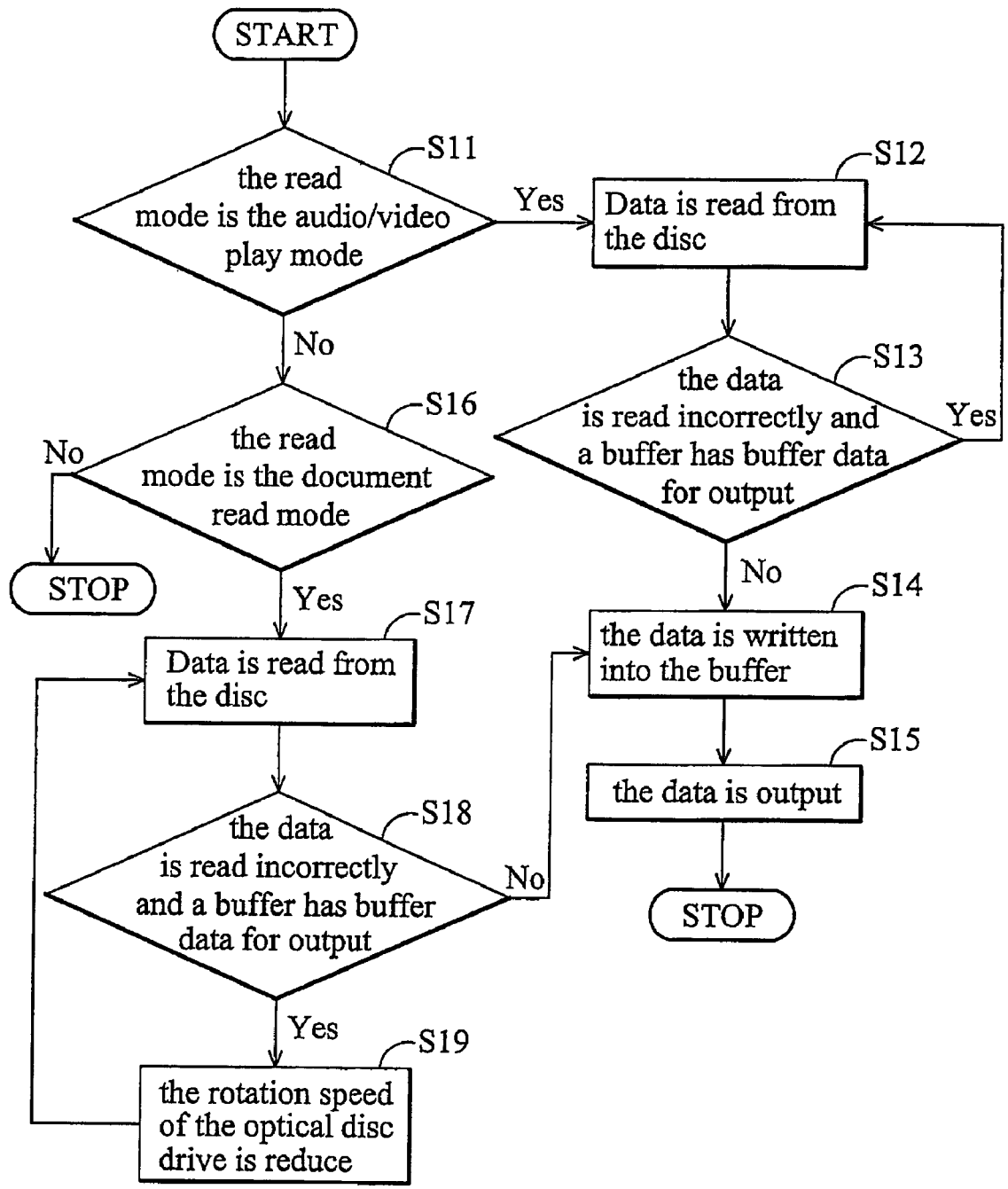
FIG. 3 is a flow diagram of an embodiment of the present invention.

In the first embodiment of the present invention, as shown in FIG. 3, a disc is first inserted in the optical disc drive and a read mode of the disc servo system inside is determined according to the program or application executed (step S11). For example, if the application is a music CD player, the disc servo system is in an audio/video play mode, and, if the application is a file copier, it is in a document read mode. Read procedures corresponding to these two read modes differ from each other.

If the read mode is an audio/video play mode (yes route of step S11), a first read procedure is executed as shown in the right half of FIG. 3. Generally, when the data picked up or read by an optical head of the disc servo system is correct and recognized as acceptable, this data will be written into a buffer, and then waits to be sequentially output from the buffer (as the route consisting of steps S12, S13, S14 and S15 in FIG. 3). If needed, the disc servo system will try to read the data following the acceptable data on the disk.

In case that the data is unacceptable (due to defocus, defective tracks or the similar), step S13 in the first read procedure uses a criteria to decide whether rereading is necessary, determining whether the restored data in the buffer is more than a first requirement. The first requirement is the minimum amount of stored data in the buffer to guarantee break/discontinuity proof in an audio/video play mode. If this first requirement is met, it is fine for the disc servo system to reread the data, trying to find the correct and acceptable data from the disk. As time goes by, once the disc servo system continuously fails to read out correct data from the disk and the stored data in the buffer is consumed and becomes less than the first requirement (no route of step S13), this uncertain/unacceptable data will be enforced to write into the buffer for guaranteeing the continuity of data flow and the disc servo system will try to read the data following the uncertain/unacceptable data on the disk. When this enforcement of output happens, tiny noisy sound or a defective picture may be sensed by the user of the disc servo system.

If the read mode is not an audio/video play mode (no route of step S11), it is further determined whether or not it is a document read mode (step S16). The read procedure for the disc servo system not in audio/video play mode or not in a document read mode goes to the no route of step S16 in FIG. 3. It can be achieved by skills known in the art and is not detailed here.

If the read mode is a document read mode (yes route of step S16), a second read procedure is executed as shown in the left-bottom half of FIG. 3. The same as the first read procedure, when the data picked up or read by an optical head of the disc servo system is correct and recognized as acceptable, this data will be written into a buffer, and then waits to be sequentially output from the buffer (as the route consisting of steps S17, S18, S14 and S15 in FIG. 3). If needed, the disc servo system will try to read the data following the acceptable data on the disk.

What should be noted are steps S18 and S19 in the second read procedure. Step S18 has the same function as step S13, but may differ in the criteria inside. The requirement in step S18, playing the same role of the first requirement in step S13, is defined as a second requirement hereafter. The second requirement of step S18 can be exactly the same as the first requirement in step S13, or can be not, depending upon design. Remember in mind that the second read procedure is designed for operating in a document read mode, which requires a higher standard of data accuracy and a lower standard of time constrain. The second requirement can be less than the first one, to lessen the possibility of writing unacceptable data into the buffer and increase the time of rereading. Another way to improve data accuracy is to add a step (step S19) of reducing the rotation speed of the disc after the rereading step (step S18) is determined as necessary and before the execution of rereading (step S17). A disk with less rotation speed will be easier for a disc servo system to trace tracks and to pick up correct data on the disk. In case that optional step S19 is added as shown in FIG. 3, the second requirement in step S18 can be exactly the same with the first requirement in step S13, since data accuracy has been already improved by step S19 and a less second requirement may become redundant.

Figure 4:
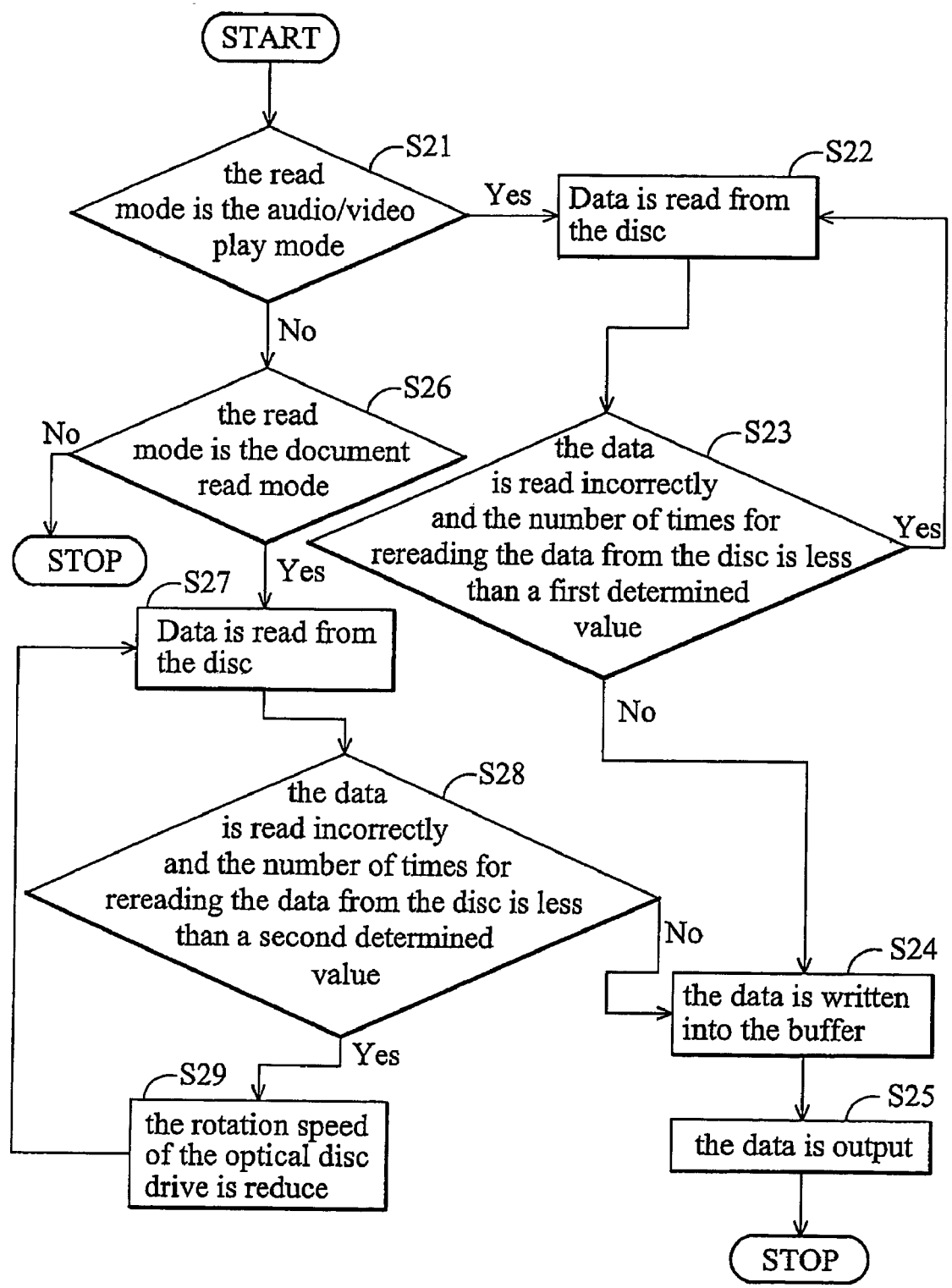
FIG. 4 is a flow diagram of another embodiment of the present invention.

FIG. 4 is a flow diagram of another embodiment of the present invention. All steps 2× in FIG. 4 are correspondingly the same with steps 1× in FIG. 3, but steps 23 and 28 in FIG. 4 are not the same with steps 13 and 18 in FIG. 3. The criteria in step 23, deciding whether rereading must be executed, is whether the read data by step S22 is unacceptable and a count of rereading is less than a first number. The criteria in step 28, similar with that in step 23, is whether the read data by step S27 is unacceptable and a count of rereading is less than a second number. Assuring a higher standard of data accuracy, rereading should be allowed to execute more times. Therefore, as being one step in the second read procedure for operating in a document read mode, step S28 involves the second number that should be more than the first number in step S23, a step in a read procedure for operating in an audio/video play mode. In case optional step S29 is added, the second number can be exactly the same with the first number and the reason has been explained in one of the previous paragraphs.

In comparison with the prior art, which use only one read procedure to read data on a disk no matter the disc servo system is in an audio/video mode or in a document read mode, the method of the present invention provides two different read procedures corresponding to these two read modes. The read procedure for operating in an audio/video mode aims to smoothness of data follow, while the other one for operating in an document read mode aims to data accuracy. Using the disc servo system with the present invention, an user will feel comfortable while listening sound and see movies, and receive reliable data from the disk.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving data accuracy and data flow of a disc servo system to read data on a disk, the method comprising:
    determining a read mode of the disc servo system;
    if the read mode is an audio/video play mode, executing a first read procedure to read the data on the disk;
    if the read mode is a document read mode, executing a second read procedure to read the data on the disk, wherein the second read procedure is different from the first read procedure; and
    outputting the data.

2. The method as claimed in claim 1, wherein the first read procedure comprises:
    reading the data from the disc;
    writing the data into a buffer; and
    outputting the data from the buffer.

3. The method as claimed in claim 2, wherein, between the steps of reading and writing the data, the first read procedure further comprises:
    rereading the data from the disc when the data as read is recognized as unacceptable and stored data in the buffer is more than a first requirement.

4. The method as claimed in claim 3, wherein the second read procedure comprises the same steps of reading, writing and outputting as the first read procedure, and, between the steps of reading and writing the data, the second read procedure further comprises:
    rereading the data from the disc when the data as read is recognized as unacceptable and the stored data in the buffer is more than a second requirement less than the first requirement.

5. The method as claimed in claim 4, wherein the second read procedure further comprises a step of reducing a rotation speed of the disc before the step of rereading the data on the disc.

6. The method as claimed in claim 2, wherein, between the steps of reading and writing the data, the first read procedure further comprises:
    rereading the data from the disc when the data as read is recognized as unacceptable and a count of rereading is less than a first number.

7. The method as claimed in claim 6, wherein the second read procedure comprises the same steps of reading, writing and outputting as the first read procedure, and, between the steps of reading and writing the data, the second read procedure further comprises:
    rereading the data from the disc when the data as read is recognized as unacceptable and the count of rereading is less than a second number more than the first number.

8. The method as claimed in claim 7, wherein the second read procedure further comprises a step of reducing a rotation speed of the disc before the step of rereading the data on the disc.

* * * * *